(12) United States Patent
Shao et al.

(10) Patent No.: US 11,454,534 B2
(45) Date of Patent: Sep. 27, 2022

(54) METHOD AND SYSTEM FOR OPTICAL AND MICROWAVE SYNERGISTIC RETRIEVAL OF ABOVEGROUND BIOMASS

(71) Applicant: Wuhan University, Wuhan (CN)

(72) Inventors: Zhenfeng Shao, Wuhan (CN); Linjing Zhang, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 330 days.

(21) Appl. No.: 16/741,778

(22) Filed: Jan. 14, 2020

(65) Prior Publication Data

US 2020/0225075 A1 Jul. 16, 2020

(30) Foreign Application Priority Data

Jan. 14, 2019 (CN) .......................... 201910046622.0

(51) Int. Cl.
| | |
|---|---|
| *G01G 9/00* | (2006.01) |
| *G06F 17/18* | (2006.01) |
| *G01S 17/89* | (2020.01) |
| *G06T 7/90* | (2017.01) |
| *G06V 20/10* | (2022.01) |

(52) U.S. Cl.
CPC .............. *G01G 9/005* (2013.01); *G01S 17/89* (2013.01); *G06F 17/18* (2013.01); *G06T 7/90* (2017.01); *G06V 20/188* (2022.01); *G06T 2207/10032* (2013.01)

(58) Field of Classification Search
CPC ......... G01G 9/005; G01S 17/89; G01S 7/417; G01S 13/865; G01S 13/89; G06F 17/18; G06T 7/90; G06T 2207/10032; G06V 20/188; G06K 9/629

USPC ......................................................... 348/144
See application file for complete search history.

(56) References Cited

U.S. PATENT DOCUMENTS

| | | | |
|---|---|---|---|
| 7,187,452 B2* | 3/2007 | Jupp ...................... | G06V 20/13 |
| | | | 356/3.01 |
| 2004/0130702 A1* | 7/2004 | Jupp ....................... | G01S 7/497 |
| | | | 356/5.01 |
| 2017/0223947 A1* | 8/2017 | Gall ...................... | A01B 79/005 |
| 2019/0174692 A1* | 6/2019 | Harman ................. | C12N 15/82 |

(Continued)

*Primary Examiner* — Tung T Vo

(74) *Attorney, Agent, or Firm* — Matthias Scholl P.C.; Matthias Scholl

(57) ABSTRACT

A method of optical and microwave synergistic retrieval of aboveground biomass, the method including: 1) obtaining an observation value of aboveground biomass (AGB) of a sample plot; 2) pre-processing laser radar (LiDAR) data, optical remote sensing data and microwave remote sensing data covering a research region, to yield crown height model (CHM) data, surface reflectance data and a backscattering coefficient, respectively; 3) extracting different LiDAR variables, extracting a plurality of optical characteristic vegetation indexes, and extracting a plurality of microwave characteristic variables; 4) establishing a multiple stepwise linear regression model of the biomass; 5) taking the biomass value of the LiDAR data coverage region as a training set and a verification sample set, and selecting samples for modeling and verification; 6) screening out the optical and microwave characteristic variables; and 7) constructing an optical model, a microwave model, and an optical and microwave synergistic model of AGB retrieval, respectively.

8 Claims, 1 Drawing Sheet

(56) References Cited

U.S. PATENT DOCUMENTS

| | | | |
|---|---|---|---|
| 2020/0034616 A1* | 1/2020 | Lindberg | G06Q 50/02 |
| 2020/0225075 A1* | 7/2020 | Shao | G01S 13/865 |

* cited by examiner

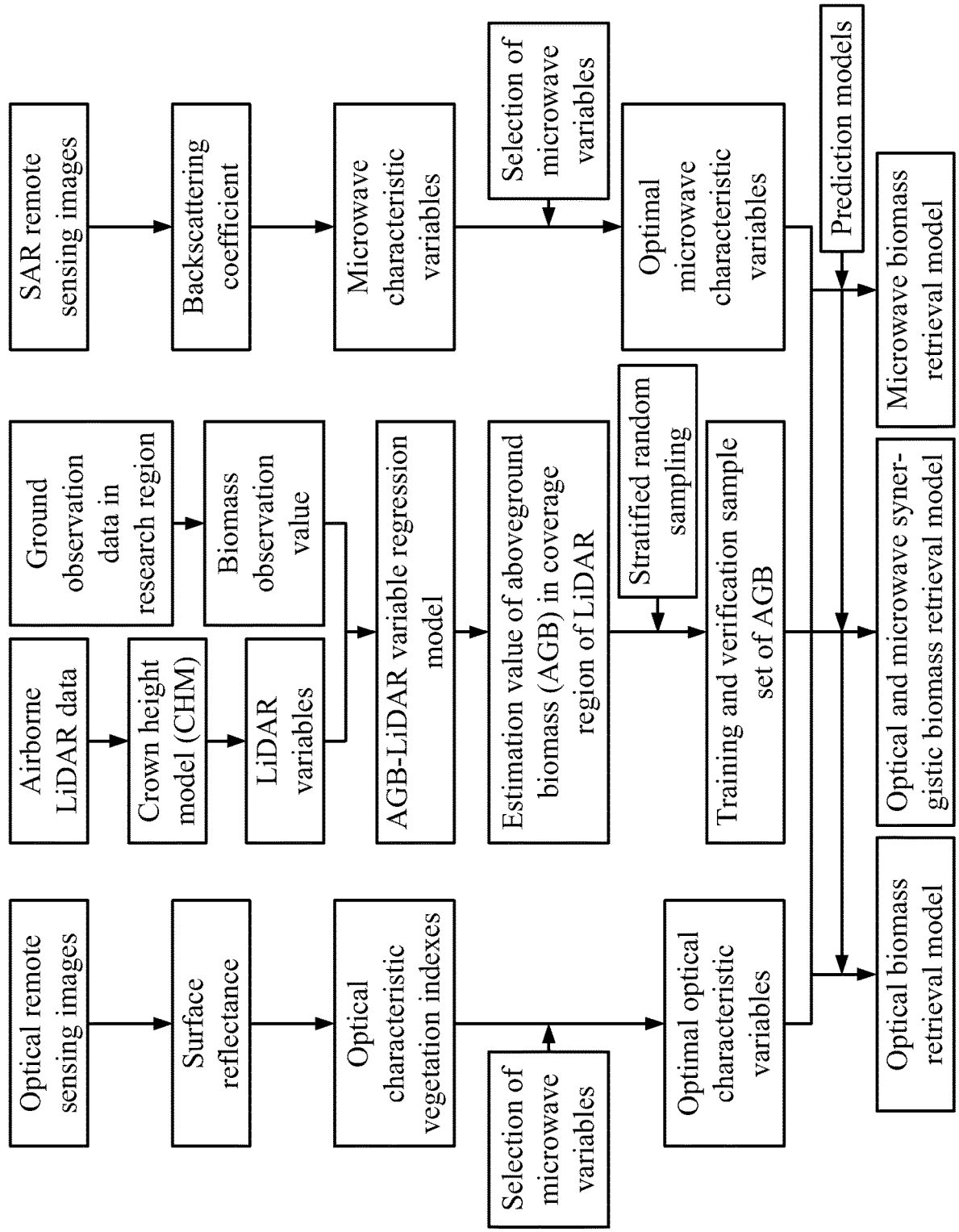

METHOD AND SYSTEM FOR OPTICAL AND MICROWAVE SYNERGISTIC RETRIEVAL OF ABOVEGROUND BIOMASS

CROSS-REFERENCE TO RELATED APPLICATIONS

Pursuant to 35 U.S.C. § 119 and the Paris Convention Treaty, this application claims foreign priority to Chinese Patent Application No. 201910046622.0 filed Jan. 14, 2019, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to a method and a system for optical and microwave synergistic retrieval of aboveground biomass (AGB).

Above-ground biomass of vegetation including the total of trunk, branch and leaf is the total of organic matters (i.e. dry weight) accumulated in the unit area at a certain time. AGB is an indicator for measuring vegetation carbon storage capacity and evaluating forest carbon balance.

Remote sensing technology is widely used in researches of vegetation parameters such as aboveground biomass of vegetation. In general, vegetation parameters are estimated by establishing a relationship model between the measured data of sample plots and remote sensing characteristic variables. However, the capture of the measurement data from the sample plots is faced with many challenges. On one hand, the accuracy of the measurement data is not evaluated; on the other hand, due to time, labor costs and unreachable areas, the collected sample plot data cannot cover an entire research region, and cannot fully reflect changes of the vegetation structure and growth status within the research region.

The multi-spectral vegetation index is one of the most widely used data for estimating the aboveground biomass of vegetation. However, passive optical remote sensing is affected by weather phenomena such as cloud, rain and snow when acquiring biomass parameter information. Further, when the vegetation is dense, the vegetation reflection spectrum information acquired by the optical remote sensing tends to saturate. SAR satellite remote sensing data is less affected by weather. However, the biomass estimation using SAR backscatter coefficient still faces challenges. On the one hand, when vegetation coverage is relatively low, the microwave remote sensing is seriously affected by the moisture content and roughness of the surface soil. On the other hand, in dense vegetation areas, the vegetation reflection spectrum information also tends to saturate.

SUMMARY

The disclosure provides a method and a system for optical and microwave synergistic retrieval of aboveground biomass to effectively extract the biomass in combination with optical and microwave remote sensing.

The method of optical and microwave synergistic retrieval of aboveground biomass comprises:

1) selecting a plurality of sample plots; measuring tree height (H) of each sample plot using a laser hypsometer and tree diameter at breast height (DBH) using a tape; determining a center of each sample plot using a GPS; deriving above-ground biomass (AGB) of vegetation of each individual tree in each sample plot by using species-specific allometric equations with inputs of the tree diameter at breast height and the tree height; adding up the AGB of all individual trees in each sample plot thereby obtaining a total AGB;
2) pre-processing LiDAR data, optical remote sensing data and microwave remote sensing data covering a research region, to yield crown height model (CHM) data, surface reflectance data and a backscattering coefficient, respectively;
3) extracting LiDAR variables based on the CHM data; based on the surface reflectance data, calculating bands between multispectral images using algorithm of band math, and extracting a plurality of optical characteristic vegetation indexes; and extracting a plurality of microwave characteristic variables based on the backscattering coefficient;
4) establishing a multiple stepwise linear regression model of biomass with the measured AGB in the sample plots as a dependent variable and the extracted LiDAR variables as independent variables, bringing the LiDAR data into the linear regression model, and obtaining a biomass estimation value of a coverage region of the LiDAR data;
5) taking the biomass estimation value of the coverage region of the LiDAR data as a training set and a verification sample set, and selecting samples for modeling and verification by a stratified random sampling method;
6) screening out optimal optical characteristic variables and optimal microwave characteristic variables by a variable screening method; and
7) putting the optimal optical characteristic variables, the optimal microwave characteristic variables and a combination of the optimal optical characteristic variables and the optimal microwave characteristic variables to a plurality of prediction models respectively, thereby constructing an optical model, a microwave model, and an optical and microwave synergistic model of AGB retrieval; modeling and verifying according to the samples selected in 5); and selecting an optimal model for biomass retrieval.

The LiDAR variables in 3) comprise a minimum value, a maximum value, a mean value, a height quantile, a standard deviation, a variation coefficient, a slope, a peak and crown coverage.

The plurality of optical characteristic vegetation indexes in 3) comprises a normalized difference vegetation index (NDVI), a simple ratio index (SR), an enhanced vegetation index (EVI), a soil adjusted vegetation index (SAVI), a modified soil adjusted vegetation index (MSAVI), an optimized soil adjusted vegetation index (OSAVI), a moisture stress index (MSI), a normalized difference water index (NDWI) and a chlorophyll index (CIgreen), which are calculated based on the following formulas:

$$NDVI = \frac{NIR - R}{NIR + R} \quad (1)$$

$$SR = \frac{NIR}{R} \quad (2)$$

$$EVI = \frac{2.5 \times (NIR - R)}{1 + NIR + 6 \times R - 7.5 \times B} \quad (3)$$

-continued $$SAVI = \frac{(1+0.5) \times (NIR - R)}{NIR + R + 1.5} \quad (4)$$

$$MSAVI = NIR + 0.5 - \sqrt{(NIR + 0.5)^2 - 2 \times (NIR - R)} \quad (5)$$

$$OSAVI = \frac{(1+0.16) \times (NIR - R)}{NIR + R + 0.16} \quad (6)$$

$$MSI = \frac{SWIR1}{NIR} \quad (7)$$

$$NDWI = \frac{NIR - SWIR1}{NIR + SWIR1} \quad (8)$$

$$Cl_{Green} = \frac{NIR}{G} - 1 \quad (9)$$

in the above formulas, R, G, B, NIR and SWIR1 refer to reflectances of red light, green light, blue light, light of near-infrared band and light of short-wave infrared band respectively.

The microwave characteristic variables in 3) comprise VV, HH, VH, HV, VV/HH, HH/HV, VV/HV and RVI, and the RVI is calculated based on the following formula:

$$RVI = \frac{8 \times HV}{HH + VV + 2 \times HV}, \quad (10)$$

where VV, HH and VH are polarization modes, and VV/HH, HH/HV and VV/HV are ratios.

The variable selection method adopted in 6) is a stepwise screening method.

The optimal optical characteristic variables in 6) comprise SR, NDVI, OSAVI, MSI and NDWI, and the optimal microwave characteristic variables comprise VV, HV, HH/HV and RVI.

The plurality of prediction models in 7) comprises models of multiple stepwise linear regression (SLR), K nearest neighbor (KNN), a support vector machine (SVM), a BP neural network (BPNN), a random forest (RF) and deep learning (DL), wherein a Stacked Sparse Autoencoder network (SSAE) model is selected as a deep learning model.

The disclosure provides a system for optical and microwave synergistic retrieval of aboveground biomass, the system comprising:

a first module, configured to select a plurality of sample plots; measure tree height (H) of each sample plot using a laser hypsometer and tree diameter at breast height (DBH) using a tape; determine a center of each sample plot using a GPS; derive above-ground biomass (AGB) of vegetation of each individual tree in each sample plot by using species-specific allometric equations with inputs of the tree diameter at breast height and the tree height; add up the AGB of all individual trees in each sample plot thereby obtaining a total AGB;

a second module, configured to pre-process LiDAR data, optical remote sensing data and microwave remote sensing data covering a research region, to yield crown height model (CHM) data, surface reflectance data and a backscattering coefficient, respectively;

a third module, configured to extract LiDAR variables based on the CHM data; based on the surface reflectance data, calculate bands between multispectral images using algorithm of band math, and extract a plurality of optical characteristic vegetation indexes; and extract a plurality of microwave characteristic variables based on the backscattering coefficient;

a fourth module, configured to establish a multiple stepwise linear regression model of biomass with the measured AGB in the sample plots as a dependent variable and the extracted LiDAR variables as independent variables, bring the LiDAR data into the linear regression model, and obtain a biomass estimation value of a coverage region of the LiDAR data;

a fifth module, configured to take the biomass estimation value of the coverage region of the LiDAR data as a training set and a verification sample set, and select samples for modeling and verification by a stratified random sampling method;

a sixth module, configured to screen out optimal optical characteristic variables and optimal microwave characteristic variables by a variable screening method; and a seventh module, configured to put the optimal optical characteristic variables, the optimal microwave characteristic variables and a combination of the optimal optical characteristic variables and the optimal microwave characteristic variables to a plurality of prediction models respectively, thereby constructing an optical model, a microwave model, and an optical and microwave synergistic model of AGB retrieval; model and verify according to the samples; and select an optimal model for biomass retrieval.

Advantages of the method and a system for optical and microwave synergistic retrieval of aboveground biomass according to embodiments of the disclosure are summarized as follows:

(1) Biomass values extracted from the LiDAR data are taken as a training set and a verification sample set, thereby avoiding usage of time-consuming and labor-consuming manual sampling method.

(2) Biomass samples are selected by a stratified random sampling method. The data set realizes full coverage of the biomass values of the research region in statistics and geographical location, and fully reflects the changes on the growth status of a vegetation community of the research region.

(3) A synergistic retrieval model of optical and microwave data is constructed to estimate the biomass, thereby effectively improving a quantitative retrieval accuracy of the aboveground biomass.

BRIEF DESCRIPTION OF THE DRAWINGS

The invention is described hereinbelow with reference to accompanying drawings, in which the sole FIGURE is a method of optical and microwave synergistic retrieval of aboveground biomass according to one embodiment of the disclosure.

DETAILED DESCRIPTION OF THE EMBODIMENTS

To further illustrate, embodiments detailing a method and a system for optical and microwave synergistic retrieval of aboveground biomass are described below. It should be noted that the following embodiments are intended to describe and not to limit the disclosure.

The disclosure is different from a previous retrieval method as follows: first, the aboveground biomass value of the LiDAR data coverage region is obtained by establishing a multiple stepwise linear regression model of the biomass with the measured AGB of the sample plot as a dependent variable, the extracted LiDAR variable as an independent variable; then, the biomass value of the LiDAR data coverage region is taken as the training set and the verification sample set, and a certain quantity of samples are selected for modeling and verification by the stratified random sampling method; finally, the optical and microwave characteristic variables are screened out by a variable screening method, the optimal optical variable, the optimal microwave variable and a combination thereof are applied to a plurality of prediction models respectively and an optical model, a microwave model and a model of optical and microwave synergy are constructed for AGB retrieval, respectively.

In an example of the disclosure, the forest aboveground biomass in Guangzhou Conghua Research Region is estimated based on Landsat8 Operational Land Imager (OLI) and RADARSAT-2. As shown in FIG. 1, the example of the disclosure comprises the following specific steps.

In 1), the aboveground biomass (AGB) of the sample plot of the research region is calculated, which comprises obtaining an AGB observation value of the sample plot based on a calculation formula of the aboveground biomass by using an individual tree parameter data set of the sample plot obtained through a ground observation test.

In an example, the measurement result data set of tree height and breast diameter parameters of individual trees within different sample plots is obtained by ground observation. According to an allometric growth model of main tree species in the research region, individual tree biomass within the sample plot is first calculated, total biomass of the sample plot is further calculated, and a ratio of the total biomass of the sample plot and an area the sample land is a biomass observation value, in the unit of Mg/ha, of the sample plot.

In 2), a crown height model (CHM) value, surface reflectance data and a backscattering coefficient are obtained respectively by pre-processing LiDAR data, optical remote sensing data and microwave remote sensing data covering the research region respectively.

In an example, the LiDAR data, Landsat8 OLI and RADARSAT-2 data are pre-processed below. In a specific example, Terrascan software may be used. First, points with a height greater than a median height of their surrounding points and isolated points are removed; next, the remaining LiDAR point cloud data is divided into ground points and non-ground points, and then, a Digital Elevation Model (DEM) and a Digital Surface Model (DSM) with their resolutions both being 1 m are generated for the ground points and all first echo interpolations; then, a Crown Height Model (CHM) with the resolution being 1 m, that is, a normalized height value, is obtained by subtracting the DEM from the DSM, and a CHM pixel with a value of 2 m-35 m is retained and taken as a vegetation pixel to exclude low undergrowth vegetation and ground objects higher than trees within the research region; finally, geometric correction is performed for a CHM image by using an orthorectified Landsat8 image as a reference.

In a specific example, ENVI 5.1 software may be used. First, radiometric calibration of the image is realized by converting a Digital Number (DN) into an apparent radiance value; next, a surface reflectance image is obtained by performing atmospheric correction for the calibrated image based on a Fast Line-of-sight Atmospheric Analysis of Spectral Hypercube (FLAASH) model; then, orthorectification is performed for the image subjected to the atmospheric correction by using a globally disclosed DEM of 30 m; finally, an optical image covering the Conghua research region is obtained by cropping the orthorectified Landsat8-OLI image based on the pre-processed LiDAR CHM image.

In a specific example, a Next European Space Agency (ESA) SAR Toolbox (NEST) software may be used. First, the backscattering coefficient is obtained by performing radiometric calibration for an RADARSAT-2 image; then, speckle noise is reduced by filtering the Synthetic Aperture Radar (SAR) data; geometric correction is performed for the SAR data by using the pre-processed Landsat8-OLI image, and the data is re-sampled to a spatial resolution (30 m) consistent with the Landsat8 OLI; finally, the pre-processed Landsat8 OLI and RADARSAT-2 are cropped to only retain the Landsat8 OLI and RADARSAT-2 images consistent with the research region.

In 3), the LiDAR variable, the optical variable and the microwave variable are extracted as follows: a plurality of LiDAR variables are extracted based on CHM data, a plurality of optical characteristic vegetation indexes are extracted based on optical surface reflectance data, and a plurality of microwave characteristic variables are extracted based on microwave backscattering coefficient data.

The LiDAR variables calculated based on the CHM comprise a minimum value, a maximum value, a mean value, a height quantile, a standard deviation, a variation coefficient, a slope, a peak and a crown coverage. These variables are common variables in LiDAR statistical variables, which will not be described herein. For example, the minimum value of the CHM values within a limitation range is extracted. The value range covers these LiDAR variables obtained within a resolution, i.e. 30 m*30 m, which is same as that of a satellite image.

A normalized difference vegetation index (NDVI), a simple ratio index (SR), an enhanced vegetation index (EVI), a soil adjusted vegetation index (SAVI), a modified soil adjusted vegetation index (MSAVI), an optimized soil adjusted vegetation index (OSAVI), a moisture stress index (MSI), a normalized difference water index (NDWI) and a chlorophyll index (CIgreen) are calculated based on the pre-processed Landsat8 OLI surface reflectance data, which are expressed as formulas (1)-(9).

$$NDVI = \frac{NIR - R}{NIR + R} \tag{1}$$

$$SR = \frac{NIR}{R} \tag{2}$$

$$EVI = \frac{2.5 \times (NIR - R)}{1 + NIR + 6 \times R - 7.5 \times B} \tag{3}$$

$$SAVI = \frac{(1 + 0.5) \times (NIR - R)}{NIR + R + 1.5} \tag{4}$$

$$MSAVI = NIR + 0.5 - \sqrt{(NIR + 0.5)^2 - 2 \times (NIR - R)} \tag{5}$$

$$OSAVI = \frac{(1 + 0.16) \times (NIR - R)}{NIR + R + 0.16} \tag{6}$$

$$MSI = \frac{SWIR1}{NIR} \tag{7}$$

$$NDWI = \frac{NIR - SWIR1}{NIR + SWIR1} \tag{8}$$

$$CI_{Green} = \frac{NIR}{G} - 1 \tag{9}$$

In the above formulas, R, G, B, NIR and SWIR1 refer to reflectances of red light, green light, blue light, light of near-infrared band and light of short-wave infrared band respectively.

The microwave characteristic variables calculated based on the pre-processed RADARSAT-2 data comprise VV, HH, VH, HV, VV/HH, HH/HV, VV/HV and RVI, where VV, HH and VH are three polarization modes of the RADARSAT-2 data, and VV/HH, HH/HV and VV/HV are corresponding ratios, where the RVI is calculated based on the following formula.

$$RVI = \frac{8 \times HV}{HH + VV + 2 \times HV} \quad (10)$$

In 4), an AGB reference map is obtained, which comprises obtaining a biomass estimation value of the LiDAR data coverage region by establishing the multiple stepwise linear regression model of the biomass with the sample plot measured AGB as the dependent variable, and the extracted LiDAR variables as the independent variables.

In an example, an AGB-LiDAR variable regression model is obtained by establishing a relationship model between the AGB and the LiDAR variables by the multiple stepwise linear regression method with the sample plot measured AGB as the dependent variable, and the extracted LiDAR variables as the independent variables, thereby obtaining the biomass value of the LiDAR data coverage region as the biomass reference map established by a subsequent retrieval model.

In 5), stratified random sampling is performed, which comprises taking the biomass value of the LiDAR data coverage region as the training set and the verification sample set and selecting a certain quantity of samples for modeling and verification by the stratified random sampling method.

The biomass value of the LiDAR data coverage region is taken as the training set and the verification sample set and a certain quantity of samples are selected for the subsequent modeling and verification by the stratified random sampling method. When the stratified random sampling is implemented, stratification is performed with two LiDAR height variables, that is, the mean value and the standard deviation as prior knowledge since these two variables can directly reflect a forest structure and its growth status. First, data of a LiDAR strip coverage region is prepared, which comprises the AGB value and its corresponding predictor variable values (comprising all optical variables, SAR variables and height mean values and standard deviations) in the biomass reference map; next, the above data sets are arranged in an ascending order according to the mean value, and then divided averagely into 10 data layers of a same size; then, different data layers are arranged in the ascending order according to the standard deviation, and then divided averagely into 4 equal parts, thereby generating a total of 40 data layers of the same size; finally, 20 samples are randomly selected from each data layer, and a total of 800 pieces of sample data may be obtained and randomly divided into a training set and a verification sample set at a ratio of 3:1.

In 6), the optimal optical and microwave variables are selected, which comprises selecting the optical and microwave characteristic variables by the variable screening method.

In an example, the optical and microwave characteristic variables are preferably screened respectively by a stepwise screening method according to the following steps: (1) it is assumed that n is the number of predictor variables, each variable may be excluded once from a predictor variable set, n groups of variables are formed, each group comprises n−1 variables, and model training is performed by inputting the n groups of variables into the prediction models respectively; (2) accuracy verification is performed for all models at step (1), verification indexes are RMSE and $R^2$, and the model with the optimal prediction effect (that is, $R^2$ is maximum) can indirectly verify that the predictor variables are not adopted by the model has the worst interpretation capability; (3) the variable with the worst interpretation capability determined at step 2 is removed from a candidate variable set; (4) the above steps are not repeated until $R^2$ converges. It is to be noted that the mean value of the verification accuracies of all prediction models (that is, SLR, KNN, BPNN, SVM, RF and SSAE) is adopted in the accuracy evaluation of the models. The optimal optical characteristic variables finally screened are SR, NDVI, OSAVI, MSI and NDWI, and the optimal microwave characteristic variables finally screened are VV, HV, HH/HV and RVI.

In 7), the optical model, the microwave model and the optical and microwave synergistic biomass retrieval model are constructed, which comprises constructing the optical model, the microwave model and the optical and microwave synergistic model of the AGB retrieval, that is, an optical biomass retrieval model, a microwave biomass retrieval model and an optical and microwave synergistic biomass retrieval model. The biomass retrieval is realized by selecting the optimal model after the modeling and verification are realized according to the samples selected in 5).

Preferably, the selected prediction models comprise models of multiple stepwise linear regression (SLR), K nearest neighbor (KNN), a support vector machine (SVM), a BP neural network (BPNN), a random forest (RF) and deep learning (DL), where a Stacked Sparse Autoencoder network (SSAE) model is selected as the deep learning model.

Compared with the traditional statistical regression method, the KNN, SVM, BPNN, RF methods and the DL method drawing high attention in recent years can effectively describe a complex non-linear relationship between the vegetation parameters and prediction variables. These methods display a larger application potential in the estimation research of the biomass and other vegetation parameters, and are easier to use in engineering implementation than a parameterization method.

In an example, the optimal optical variables (SR, NDVI, OSAVI, MSI and NDWI), the optimal microwave variables (VV, HV, HH/HV and RVI) and variables of the optimal optical and microwave synergy are applied to six prediction models (SLR, KNN, SVM, BPNN, RF and SSAE) respectively. The synergistic strategy is to construct the optical retrieval model, the microwave retrieval model and the optical and microwave synergistic retrieval model of the AGB by inputting all optimal optical variables and all optimal microwave variables together into these 6 prediction models respectively, where the input variables of the optical retrieval model are the optimal optical variables, the input variables of the microwave retrieval model are the optimal microwave variables, and the input variables of the synergistic retrieval model are all optimal optical variables and all optimal microwave variables.

In an experiment, the result map of the aboveground biomass of Guangzhou Conghua research region is estimated by using the Landsat8 OLI and RADARSAT-2 satellite data based on the optical and microwave synergistic retrieval model according to the disclosure.

Comparison verification of the estimation results of the optical retrieval model and the microwave retrieval model and the result of the synergistic retrieval is performed with the forest in Guangzhou Conghua Research Region as an object, where the objective evaluation indexes are the determination coefficient ($R^2$), a root mean square error (RMSE) and a relative root mean square error (RMSEr).

TABLE 1

Accuracy evaluation results of biomass retrieval models

| Retrieval model | Prediction method | $R^2$ | RMSE (Mg/ha) | RMSEr (%) |
|---|---|---|---|---|
| optical retrieval model | SLR | 0.503 | 45.435 | 30.196 |
| | KNN | 0.558 | 41.643 | 27.676 |
| | BPNN | 0.561 | 40.554 | 26.952 |
| | SVM | 0.564 | 39.762 | 26.426 |
| | RF | 0.610 | 36.446 | 24.222 |
| | SSAE | 0.706 | 30.453 | 20.239 |
| microwave retrieval model | SLR | 0.469 | 46.790 | 31.097 |
| | KNN | 0.449 | 48.812 | 32.440 |
| | BPNN | 0.462 | 47.770 | 31.748 |
| | SVM | 0.496 | 45.775 | 30.422 |
| | RF | 0.528 | 42.933 | 28.533 |
| | SSAE | 0.589 | 37.831 | 25.142 |
| synergistic retrieval model | SLR | 0.594 | 37.482 | 24.910 |
| | KNN | 0.664 | 33.381 | 22.185 |
| | BPNN | 0.677 | 32.750 | 21.765 |
| | SVM | 0.684 | 32.127 | 21.352 |
| | RF | 0.744 | 27.995 | 18.606 |
| | SSAE | 0.812 | 21.753 | 14.457 |

The verification results are as shown in Table 1. It is found in all prediction methods that the estimation accuracy of the deep learning (SSAE) method is the highest and the synergy of optical and microwave data is better than the prediction result of a single data source in all predictions methods. Therefore, the synergy of optical and microwave data achieves the best estimation effect in combination with the deep learning model, where the determination coefficient is 0.812, the root mean square error is 21.753, and the relative root mean square error is 14.457%. It indicates that the synergy of optical and microwave data can exert respective advantages of the optical and microwave data in the AGB retrieval, thereby improving the retrieval accuracy.

In a specific example, an automatic operation flow of the above technical solution may be realized by adopting computer software technology, or a corresponding system may be provided in a modular manner. An example of the disclosure further provides a system for optical and microwave synergistic retrieval of aboveground biomass, comprising the following modules:

a first module, configured to select a plurality of sample plots; measure tree height (H) of each sample plot using a laser hypsometer and tree diameter at breast height (DBH) using a tape; determine a center of each sample plot using a GPS; derive above-ground biomass (AGB) of vegetation of each individual tree in each sample plot by using species-specific allometric equations with inputs of the tree diameter at breast height and the tree height; add up the AGB of all individual trees in each sample plot thereby obtaining a total AGB;

a second module, configured to pre-process LiDAR data, optical remote sensing data and microwave remote sensing data covering a research region, to yield crown height model (CHM) data, surface reflectance data and a backscattering coefficient, respectively;

a third module, configured to extract LiDAR variables based on the CHM data; based on the surface reflectance data, calculate bands between multispectral images using algorithm of band math, and extract a plurality of optical characteristic vegetation indexes; and extract a plurality of microwave characteristic variables based on the backscattering coefficient;

a fourth module, configured to establish a multiple stepwise linear regression model of biomass with the measured AGB in the sample plots as a dependent variable and the extracted LiDAR variables as independent variables, bring the LiDAR data into the linear regression model, and obtain a biomass estimation value of a coverage region of the LiDAR data;

a fifth module, configured to take the biomass estimation value of the coverage region of the LiDAR data as a training set and a verification sample set, and select samples for modeling and verification by a stratified random sampling method;

a sixth module, configured to screen out optimal optical characteristic variables and optimal microwave characteristic variables by a variable screening method; and a seventh module, configured to put the optimal optical characteristic variables, the optimal microwave characteristic variables and a combination of the optimal optical characteristic variables and the optimal microwave characteristic variables to a plurality of prediction models respectively, thereby constructing an optical model, a microwave model, and an optical and microwave synergistic model of AGB retrieval; model and verify according to the samples; and select an optimal model for biomass retrieval.

It will be obvious to those skilled in the art that changes and modifications may be made, and therefore, the aim in the appended claims is to cover all such changes and modifications.

What is claimed is:

1. A method, comprising:
   1) selecting a plurality of sample plots; measuring tree height (H) of each sample plot using a laser hypsometer and tree diameter at breast height (DBH) using a tape; determining a center of each sample plot using a GPS; deriving above-ground biomass (AGB) of vegetation of each individual tree in each sample plot by using species-specific allometric equations with inputs of the tree diameter at breast height and the tree height; adding up the AGB of all individual trees in each sample plot thereby obtaining a total AGB;
   2) pre-processing LiDAR data, optical remote sensing data and microwave remote sensing data covering a research region, to yield crown height model (CHM) data, surface reflectance data and a backscattering coefficient, respectively;
   3) extracting LiDAR variables based on the CHM data; based on the surface reflectance data, calculating bands between multispectral images using algorithm of band math, and extracting a plurality of optical characteristic vegetation indexes; and extracting a plurality of microwave characteristic variables based on the backscattering coefficient;
   4) establishing a multiple stepwise linear regression model of biomass with the measured AGB in the sample plots as a dependent variable and the extracted LiDAR variables as independent variables, bringing the LiDAR data into the linear regression model, and obtaining a biomass estimation value of a coverage region of the LiDAR data;
   5) taking the biomass estimation value of the coverage region of the LiDAR data as a training set and a verification sample set, and selecting samples for modeling and verification by a stratified random sampling method;

6) screening out optimal optical characteristic variables and optimal microwave characteristic variables by a variable screening method; and 7) putting the optimal optical characteristic variables, the optimal microwave characteristic variables and a combination of the optimal optical characteristic variables and the optimal microwave characteristic variables to a plurality of prediction models respectively, thereby constructing an optical model, a microwave model, and an optical and microwave synergistic model of AGB retrieval; modeling and verifying according to the samples selected in 5); and selecting an optimal model for biomass retrieval.

2. The method of claim 1, wherein the LiDAR variables in 3) comprise a minimum value, a maximum value, a mean value, a height quantile, a standard deviation, a variation coefficient, a slope, a peak and crown coverage.

3. The method of claim 1, wherein the plurality of optical characteristic vegetation indexes in 3) comprises a normalized difference vegetation index (NDVI), a simple ratio index (SR), an enhanced vegetation index (EVI), a soil adjusted vegetation index (SAVI), a modified soil adjusted vegetation index (MSAVI), an optimized soil adjusted vegetation index (OSAVI), a moisture stress index (MSI), a normalized difference water index (NDWI) and a chlorophyll index ($CI_{green}$), which are calculated based on the following formulas:

$$NDVI = \frac{NIR - R}{NIR + R} \quad (1)$$

$$SR = \frac{NIR}{R} \quad (2)$$

$$EVI = \frac{2.5 \times (NIR - R)}{1 + NIR + 6 \times R - 7.5 \times B} \quad (3)$$

$$SAVI = \frac{(1 + 0.5) \times (NIR - R)}{NIR + R + 1.5} \quad (4)$$

$$MSAVI = NIR + 0.5 - \sqrt{(NIR + 0.5)^2 - 2 \times (NIR - R)} \quad (5)$$

$$OSAVI = \frac{(1 + 0.16) \times (NIR - R)}{NIR + R + 0.16} \quad (6)$$

$$MSI = \frac{SWIR1}{NIR} \quad (7)$$

$$NDWI = \frac{NIR - SWIR1}{NIR + SWIR1} \quad (8)$$

$$CI_{Green} = \frac{NIR}{G} - 1; \quad (9)$$

wherein, R, G, B, NIR and SWIR1 refer to reflectances of red light, green light, blue light, light of near-infrared band and light of short-wave infrared band, respectively.

4. The method of claim 1, wherein the microwave characteristic variables in 3) comprise VV, HH, VH, HV, VV/HH, HH/HV, VV/HV and RVI, and the RVI is calculated based on the following formula:

$$RVI = \frac{8 \times HV}{HH + VV + 2 \times HV} \quad (10)$$

where VV, HH and VH are polarization modes, and VV/HH, HH/HV and VV/HV are ratios.

5. The method of claim 1, wherein the variable selection method adopted in 6) is a stepwise screening method.

6. The method of claim 5, wherein the optimal optical characteristic variables in 6) comprise SR, NDVI, OSAVI, MSI and NDWI, and the optimal microwave characteristic variables comprise VV, HV, HH/HV and RVI.

7. The method of claim 1, wherein the plurality of prediction models in 7) comprises models of multiple stepwise linear regression (SLR), K nearest neighbor (KNN), a support vector machine (SVM), a BP neural network (BPNN), a random forest (RF) and deep learning (DL), wherein a Stacked Sparse Autoencoder network (SSAE) model is selected as a deep learning model.

8. A system, comprising:
a first module, configured to select a plurality of sample plots; measure tree height (H) of each sample plot using a laser hypsometer and tree diameter at breast height (DBH) using a tape; determine a center of each sample plot using a GPS; derive above-ground biomass (AGB) of vegetation of each individual tree in each sample plot by using species-specific allometric equations with inputs of the tree diameter at breast height and the tree height; add up the AGB of all individual trees in each sample plot thereby obtaining a total AGB;

a second module, configured to pre-process LiDAR data, optical remote sensing data and microwave remote sensing data covering a research region, to yield crown height model (CHM) data, surface reflectance data and a backscattering coefficient, respectively;

a third module, configured to extract LiDAR variables based on the CHM data; based on the surface reflectance data, calculate bands between multispectral images using algorithm of band math, and extract a plurality of optical characteristic vegetation indexes; and extract a plurality of microwave characteristic variables based on the backscattering coefficient;

a fourth module, configured to establish a multiple stepwise linear regression model of biomass with the measured AGB in the sample plots as a dependent variable and the extracted LiDAR variables as independent variables, bring the LiDAR data into the linear regression model, and obtain a biomass estimation value of a coverage region of the LiDAR data;

a fifth module, configured to take the biomass estimation value of the coverage region of the LiDAR data as a training set and a verification sample set, and select samples for modeling and verification by a stratified random sampling method;

a sixth module, configured to screen out optimal optical characteristic variables and optimal microwave characteristic variables by a variable screening method; and a seventh module, configured to put the optimal optical characteristic variables, the optimal microwave characteristic variables and a combination of the optimal optical characteristic variables and the optimal microwave characteristic variables to a plurality of prediction models respectively, thereby constructing an optical model, a microwave model, and an optical and microwave synergistic model of AGB retrieval; model and verify according to the samples; and select an optimal model for biomass retrieval.

* * * * *